(12) United States Patent
Chow et al.

(10) Patent No.: US 10,067,972 B2
(45) Date of Patent: *Sep. 4, 2018

(54) SEMANTIC DATABASE DRIVEN FORM VALIDATION

(71) Applicant: International Business Machines Corporation, Armonk, NY (US)

(72) Inventors: Ken Yian Chow, Singapore (SG); Tien Hiong Lee, Singapore (SG); Jason M. McCarthy, Harvey York County (CA); Weng Sing Tang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 357 days.

This patent is subject to a terminal disclaimer.

(21) Appl. No.: 14/943,350

(22) Filed: Nov. 17, 2015

(65) Prior Publication Data

US 2017/0139975 A1    May 18, 2017

(51) Int. Cl.
*G06N 5/04*    (2006.01)
*G06F 17/30*    (2006.01)
*G06N 5/02*    (2006.01)
*G06F 17/24*    (2006.01)
*G06F 17/27*    (2006.01)

(52) U.S. Cl.
CPC ...... *G06F 17/30371* (2013.01); *G06F 17/243* (2013.01); *G06F 17/2725* (2013.01); *G06F 17/30731* (2013.01); *G06F 17/30734* (2013.01); *G06F 17/30864* (2013.01); *G06F 17/30911* (2013.01); *G06F 17/30917* (2013.01); *G06F 17/30929* (2013.01); *G06F 17/30938* (2013.01); *G06F 17/30961* (2013.01); *G06N 5/022* (2013.01); *G06N 5/04* (2013.01)

(58) Field of Classification Search
CPC ....................................................... G06N 5/04
USPC ............................................................ 706/46
See application file for complete search history.

(56) References Cited

U.S. PATENT DOCUMENTS

| 8,103,962 | B2 | 1/2012 | Embley et al. |
| 8,156,420 | B2 | 4/2012 | Nie et al. |
| 8,214,401 | B2 | 7/2012 | Rao et al. |
| 8,443,005 | B1 | 5/2013 | Goldman et al. |
| 8,515,999 | B2 | 8/2013 | de Cerqueira Gatti et al. |
| 9,020,971 | B2 | 4/2015 | Bayliss et al. |
| 2010/0281061 | A1 | 11/2010 | Chen |

(Continued)

OTHER PUBLICATIONS

Gatti et al ("Domain-Independent Data Validation and Content Assistance as a Service" 2012).*

(Continued)

*Primary Examiner* — Lut Wong
(74) *Attorney, Agent, or Firm* — Maeve McCarthy; A. Imtiaz Billah

(57) ABSTRACT

Embodiments of the present invention provide a means for validating electronic forms using one or more semantic databases. The invention includes processing an electronic form into individual elements and generating entities for the individual elements. The closest matching ontology is found for each entity and the pairings are grouped into a general formal ontology tree. The entities in the general formal ontology tree are traversed using generated rules. This analysis yields validation results that are combined with the original form to create an annotated form.

17 Claims, 6 Drawing Sheets

(56) References Cited

U.S. PATENT DOCUMENTS

| | | | |
|---|---|---|---|
| 2011/0231384 A1* | 9/2011 | Koroteyev | G06F 17/30734 707/709 |
| 2012/0101975 A1 | 4/2012 | Khosravy | |
| 2013/0166515 A1 | 6/2013 | Kung et al. | |
| 2013/0260358 A1 | 10/2013 | Lorge et al. | |
| 2014/0007056 A1 | 1/2014 | Leizerovich et al. | |

OTHER PUBLICATIONS

U.S. Appl. No. 15/064,721, filed Mar. 9, 2016; Entitled "Semantic Database Driven Form Validation".

List of IBM Patents or Patent Applications Treated as Related; Dated Mar. 9, 2016; 2 pages.

Chow et al.; U.S. Appl. No. 15/183,143, filed Jun. 15, 2015; Entitled "Semantic Database Driven Form Validation".

List of IBM Patents or Patent Applications Treated as Related; Dated Jun. 17, 2016; 2 pages.

Chow et al., "Semantic Database Driven Form Validation", U.S. Appl. No. 15/713,734, filed Sep. 25, 2017, 19 pages.

IBM Appendix P: "List of IBM Patents or Patent Applications Treated as Related"; Filed Herewith; 2 pages.

Arnold, Patrick, "Semantic Enrichment of Ontology Mappings: Detecting Relation Types and Complex Correspondences", 25th GI-Workshop on Foundations of Databases, May 28, 2013-May 31, 2013, 6 pages.

Fox, Mark S., "A Foundation Ontology for Global City Indicators", Originally Published Jun. 2013, Revised May 15, 2015, Global Cities Institute Working Paper No. 3, 48 pages.

Knublauch, Holger, "SPIN—SPARQL Syntax", W3C Member Submission Feb. 22, 2011, 16 pages, <http://www.w3.org/Submission/2011/SUBM-spin-sparql-20110222/>.

Kravari et al., "Choreographing agent encounters in the Semantic Web using rules", Journal of Intelligent and Fuzzy Systems, IOS Press, vol. 27, No. 2, 2014, 12 pages.

Tang et al., "Using Bayesian decision for ontology mapping", Journal of Web Semantics, 2006, 20 pages, vol. 4, No. 4.

Aljawarneh et al.; "Design and Implementation of New Data Validation Service (NDVS) Using Semantic Web Technologies in Web Applications"; Proceedings of the World Congress on Engineering; Jul. 1-3, 2009; 6 pages; vol. I; London, UK.

* cited by examiner

SEMANTIC DATABASE DRIVEN FORM VALIDATION

BACKGROUND OF THE INVENTION

The present invention relates generally to the field of electronic form validation, and more particularly to dynamically validating form inputs based on data available from the World Wide Web using semantic search.

Electronic forms are ubiquitous on the Internet. Almost every organization that offers online services will require some electronic form to be filled out. Typically forms may include a user registration form, as well as additional forms to capture more details or interact with other systems. In essence, every single transaction that requires user input is conducted via the façade of a form. Form validation is an integral part of any connected systems to ensure that the input is meaningful when processed by backend business operations. Validation ranges from the most basic form of ensuring correct syntax, type constraints, and dependency to the more complex business rules sanity check. For instance, an e-commerce service may make heavy use of form validation to ensure that users create valid accounts and enter valid payment details. Prohibiting invalid input not only ensures the smooth processing of backend business operations, but also is increasingly more essential against malicious attacks such as Cross-Site-Scripting (XXS) and Structured Query Language (SQL) Injection.

SUMMARY

A method, computer program product, and computer system for semantic database driven form validation, comprising: processing, by one or more computer processors, a first form to reduce the first form into one or more individual elements; generating, by one or more computer processors, a group of descriptors for each of the one or more individual elements, wherein the group of descriptors comprises, at least, a set of entities for each of the one or more individual elements; matching, by one or more computer processors, each of the set of entities to a first ontology to create one or more general formal ontology (GFO) trees, wherein each of the set of entities comprises a form field; generating, by one or more computer processors, a set of rules; generating, by one or more computer processors, based, at least in part, on the generated set of rules, a set of validation results for each of the set of entities; and creating, by one or more computer processors, a resulting form, wherein the resulting form includes the first form with the set of validation results attached to each of the entities as an attribute.

DETAILED DESCRIPTION

Existing methods to validate electronic form inputs are currently very rigid and require predefined rules. The existing methods do not adapt well to ever-changing requirements from many different sources (government, corporations, institutions, etc.). Business rules are much more dynamic, and change much more frequently than the underlying supporting IT constructs. The existing methods are thus difficult to extend into future requirements and do not effectively prevent fraudulent or invalid form submission. Particular difficulty exists when making changes to what is considered valid input. In a typical scenario, if the format for a particular input changes it will be necessary to update the input validation in every piece of software which accepts that input. In many cases, each piece of software will accept that input in more than one location and each sub routine will have to be updated. The ripple effect of a needed validation change is not limited to being within a particular organization. Since all organizations seemingly deal with a similar type of business concepts and constructs, it is not difficult to recognize the huge amount of duplicated effort that cuts across organizations from various geographic locations and business domains. Notwithstanding the fact that exuberant amount of human effort is wasted to effect such changes, the lack of standardization of validation results in inconsistent behavior across entities and latency of various degrees for the changes to be effected. Embodiments of the present invention provide electronic form validation using semantic data sources.

Figure 1:
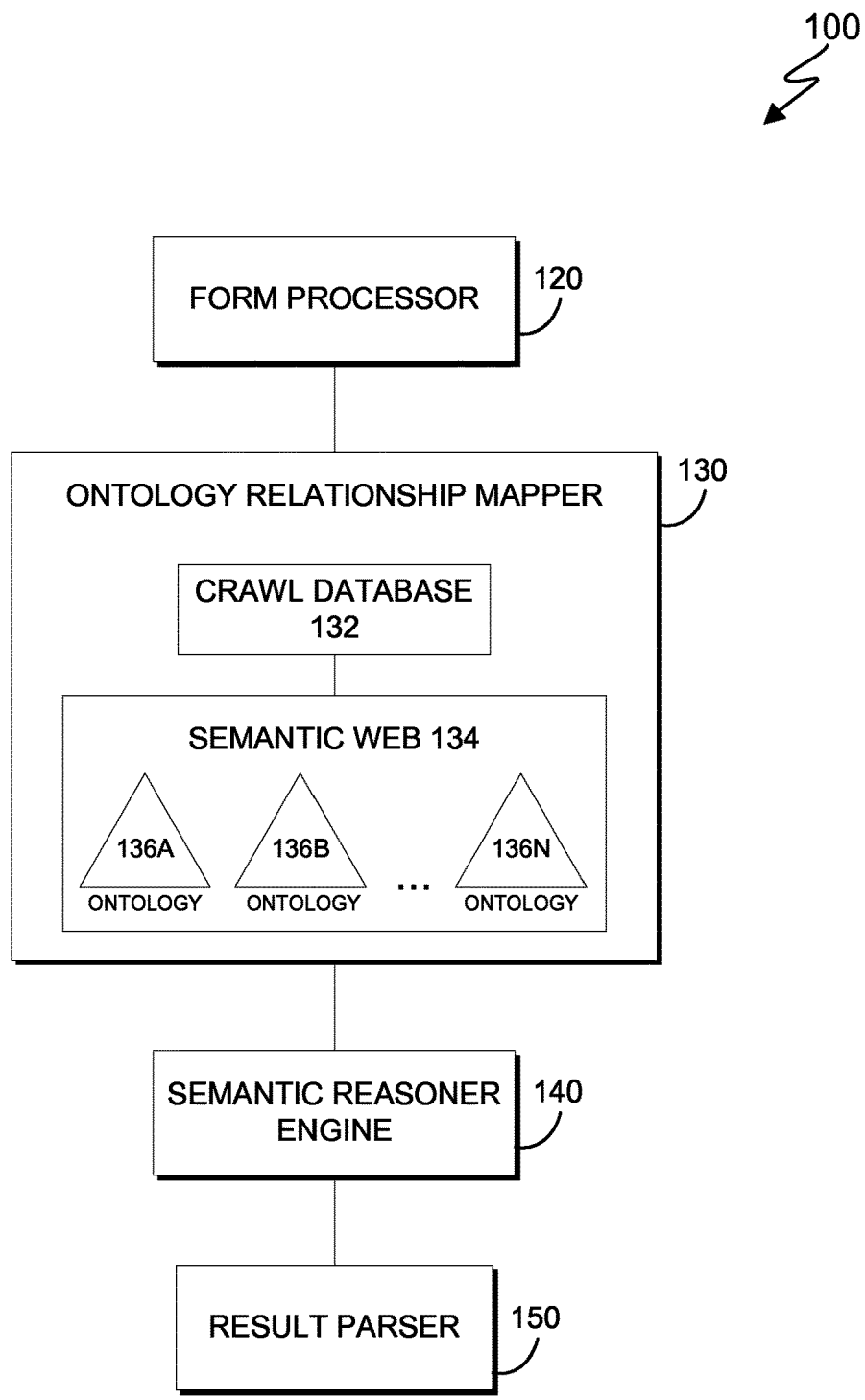
FIG. 1 is a functional block diagram illustrating a computing environment, in accordance with an embodiment of the present invention.

The present invention will now be described in detail with reference to the figures. FIG. 1 is a functional block diagram illustrating a computing environment, generally designated 100, in accordance with one embodiment of the present invention. FIG. 1 provides only an illustration of one implementation, and does not imply any limitations with regard to the environments in which different embodiments may be implemented. Many modifications to the depicted environment may be made by those skilled in the art without departing from the scope of the invention as recited by the claims. In an exemplary embodiment, computing environment 100 includes form processor 120, ontology relationship mapper 130, semantic reasoner engine 140, and result parser 150. It should be appreciated that in various embodiments, components of computing environment 100 can be located on a single device or they can be located on several devices communicating over a network.

Form processor 120 parses a semi-structured tagged electronic form (i.e., HTML, XML, etc.) by breaking it down into individual elements and generating a group of descriptors comprising entities, classes, and properties for those elements. In this exemplary embodiment, form processor 120 extracts the individual elements and properties of the form and converts them, if necessary, into a format that supports the data structure of the instant invention. For example, form processor 120 may transform the elements of a user registration form from XML format to RDF format. It should be appreciated that the form is an electronic form (i.e., administered via computer), as opposed to a paper form that a user could process into elements. Form processor 120 then passes the group of generated descriptors as an input to ontology relationship mapper 130.

Ontology relationship mapper 130 includes crawl database 132 and semantic web 134. Ontology relationship mapper 130 matches each entity (i.e., form field) from the descriptors to specific ontologies and determines if any of the ontologies are directly or indirectly related. Crawl database 132 is a semantic database containing all ontologies which have been previously assigned to matched entities (form fields) by ontology relationship mapper 130. Ontology relationship mapper 130 will first query crawl database 132 to determine if any existing ontologies in the database fit an entity of a form. If no matching ontology can be found, ontology relationship mapper 130 will search semantic web 134 over a web service to discover the closest matching ontology for the entity. It should be appreciated that semantic web 134 can be located in the cloud. Semantic web 134 includes ontologies 136A through 136N (136A-N). Ontologies 136A-136N are the grouping of various classes and objects, and their properties and relationships. Ontology relationship mapper 130 searches crawl database 132 and semantic web 134, over a web service, for the closest match and assigns the specific ontology to the entity. Ontology relationship mapper 130 creates one or more general formal ontology (GFO) trees, which are sent to semantic reasoner engine 140. A GFO tree is a general level description of knowledge categories that apply to multiple domains, and it is presented as a hierarchy of entities and associated rules that are shared across the domains.

Semantic reasoner engine 140 generates inferences and dynamically generates rules (i.e., rules that are not reused across sessions) to validate each ontology down to the level of the individual entity values. Semantic reasoner engine 140 marks the entities with a pass tag or a fail tag and creates an evaluated GFO tree, which is sent to result parser 150. The rules and inferences generated have an entity mapping which is later used by result parser 150 to evaluate the mapped entity. The entities on the GFO tree are evaluated by result parser 150 against the rules and inferences generated in the current context. Each entity is tagged (as a property) with a pass tag or a fail tag (i.e., a valid indicator or an invalid indicator, respectively), wherein a pass tag designates that an entity complies with the set of rules and a fail tag designates that an entity does not comply with the set of rules. The rule(s) which caused an invalid indicator is added as a property on the entity. The evaluated set of entities are then forwarded to result parser 150. Rules can be generated in a variety of ways, such as explicit constraints, aggregation, and predefined rules. Explicit constraints can be used with entities in an ontology that contain an explicit rules property. For example, a phone number entity contains only digits, and passport numbers are unique. Aggregation captures the aggregate results (minimum, maximum, count, average, median, etc.) from samples or multiple ontologies. This method to generate rules is useful for an entity within a finite data set, for example, addresses and postal codes. An example of use of predefined rules is business rules for password complexity. Inferences can be generated in a variety of ways, such as by transitive reasoners, entity group reasoners, and holistic reasoners. Transitive reasoners capture the constraints while traversing class and property lattices. For example, the transitive and reflexive properties of rdfs:subPropertyOf and rdfs:subclassOf indicates that the subclass will inherit the properties of the superclass (i.e., Personal Identification Number (PIN) is a superclass of National Registration Identity Cart (NRIC) number, and thus, the unique constraint will propagate to NRIC number). With entity group reasoners, using groupings of entities from a GFO tree, related entities can contain dependencies with one another. For example, geospatial entities would contain dependencies between address, postal code, city, and country. The entities must all contain values that conform to the group. In one embodiment, semantic reasoner engine 140 can use a holistic reasoner to generate inferences using the relationship between the various ontologies in a GFO tree. The holistic reasoner traverses the GFO tree and saves inherent details about each entity in order to create a context for the rules. For example, there could be one ontology specifying geospatial entities and another specifying phone number entities. Thus, using the data known from geospatial entities (i.e., country, postal code, etc.), phone number entities must have a minimum number of digits for Country X and start with a certain area code.

Result parser 150 traverses the evaluated GFO tree and individually enhances the tags on the original HTML/XML form with the validation results (i.e., a pass tag, or a fail tag and possibly the reason). In this exemplary embodiment, result parser 150 matches the entities back to the original electronic form and copies the indicators along with the rule to a copy of the electronic form. Result parser 150 creates a form that includes the original form with the validation results attached to each tag as an attribute that can be displayed to the user, who can then see which input fields failed the validation and correct the entry as needed.

Figure 2:
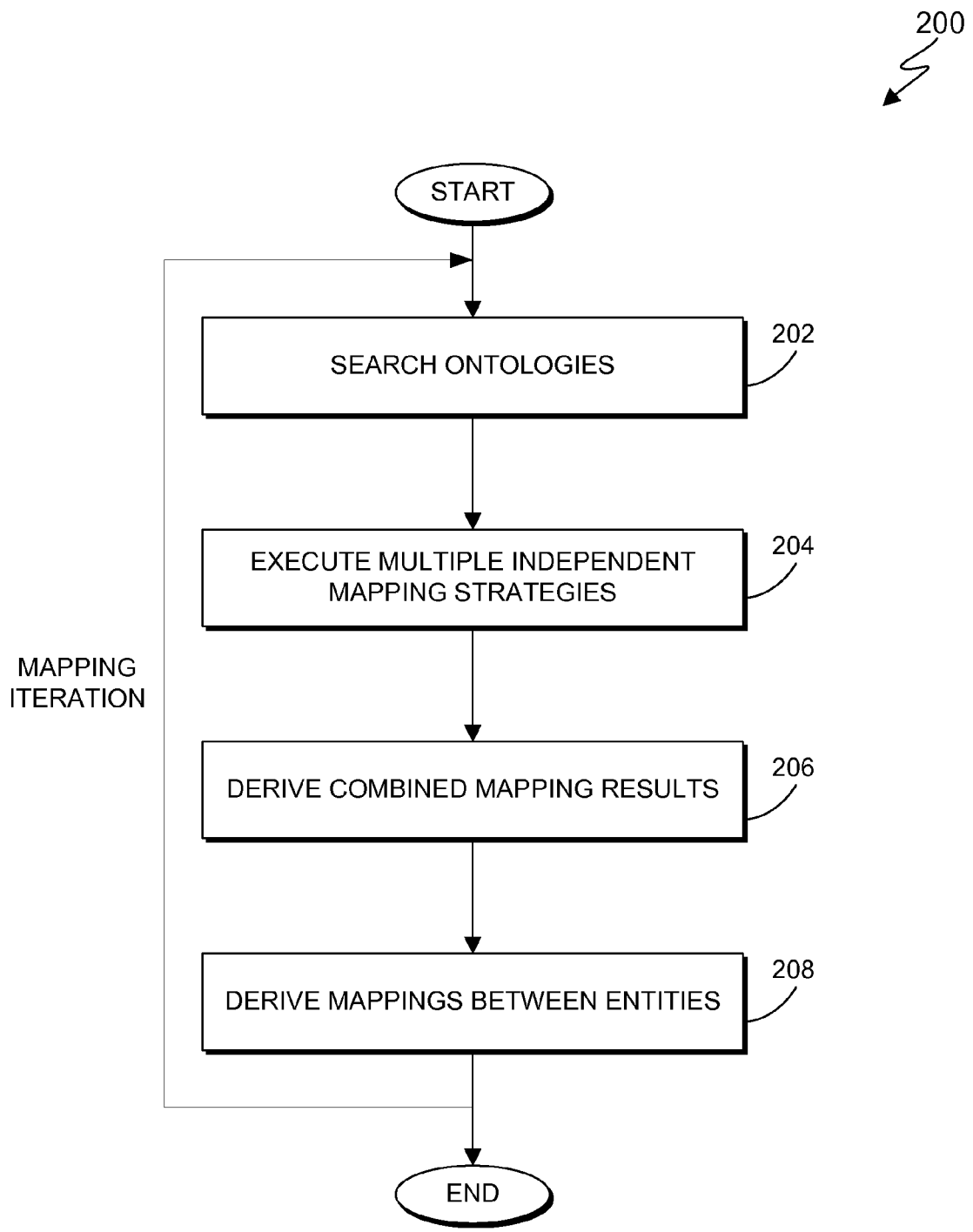
FIG. 2 is a flowchart depicting operational steps of the ontology mapping process, in accordance with an embodiment of the present invention.

FIG. 2 is a flowchart, 200, depicting the operational steps of ontology relationship mapper 130 performing the ontology mapping process, in accordance with an embodiment of the present invention.

In step 202, ontology relationship mapper 130 searches crawl database 132 and semantic web 134 for ontologies. In this exemplary embodiment, ontology relationship mapper 130 will first query crawl database 132 to determine if any existing ontologies in the database fit an entity of a form. If no matching ontology can be found, ontology relationship mapper 130 will then search semantic web 134 to discover the closest matching ontology for the entity. For example, ontology relationship mapper 130 determines that ontology 136A and 136B are possible matches.

In step 204, ontology relationship mapper 130 executes multiple independent mapping strategies, with each strategy producing a predictive value for each possible candidate mapping. In this exemplary embodiment, ontology relationship mapper 130 determines predictive values using predictive matrices, a high level method to produce predicted relationships. For example, ontology relationship mapper 130 uses k strategies, m entities in ontology 136A, and n entities in ontology 136B to create a k by m by n matrix of predictive values. It should be appreciated that predictive values are determined using algorithms currently known in the art, and that any suitable method of generating predictive values may be used. Further, analysis of the predictive values for determining the closest entity/ontology match is specific to the implemented method of generation (i.e., different predictive values represent different levels of matching).

In step 206, ontology relationship mapper 130 derives the combined mapping results from the individual decision results in the predictive matrices. In this exemplary embodiment, for each candidate mapping, the strategy-specific predictive values are aggregated into a combined predictive value.

In step 208, ontology relationship mapper 130 uses the individual or combined predictive values to derive mappings between entities from ontology 136A to ontology 136B. In this exemplary embodiment, ontology relationship mapper 130 chooses the candidate mapping (i.e., entity and ontology) with the predictive value that yields the most accurate match for that entity. The mapped pairings are combined to create a GFO tree.

Accordingly, by performing the operational steps of FIG. 2, ontology relationship mapper 130 determines where an entity fits within an ontology.

Figure 3:
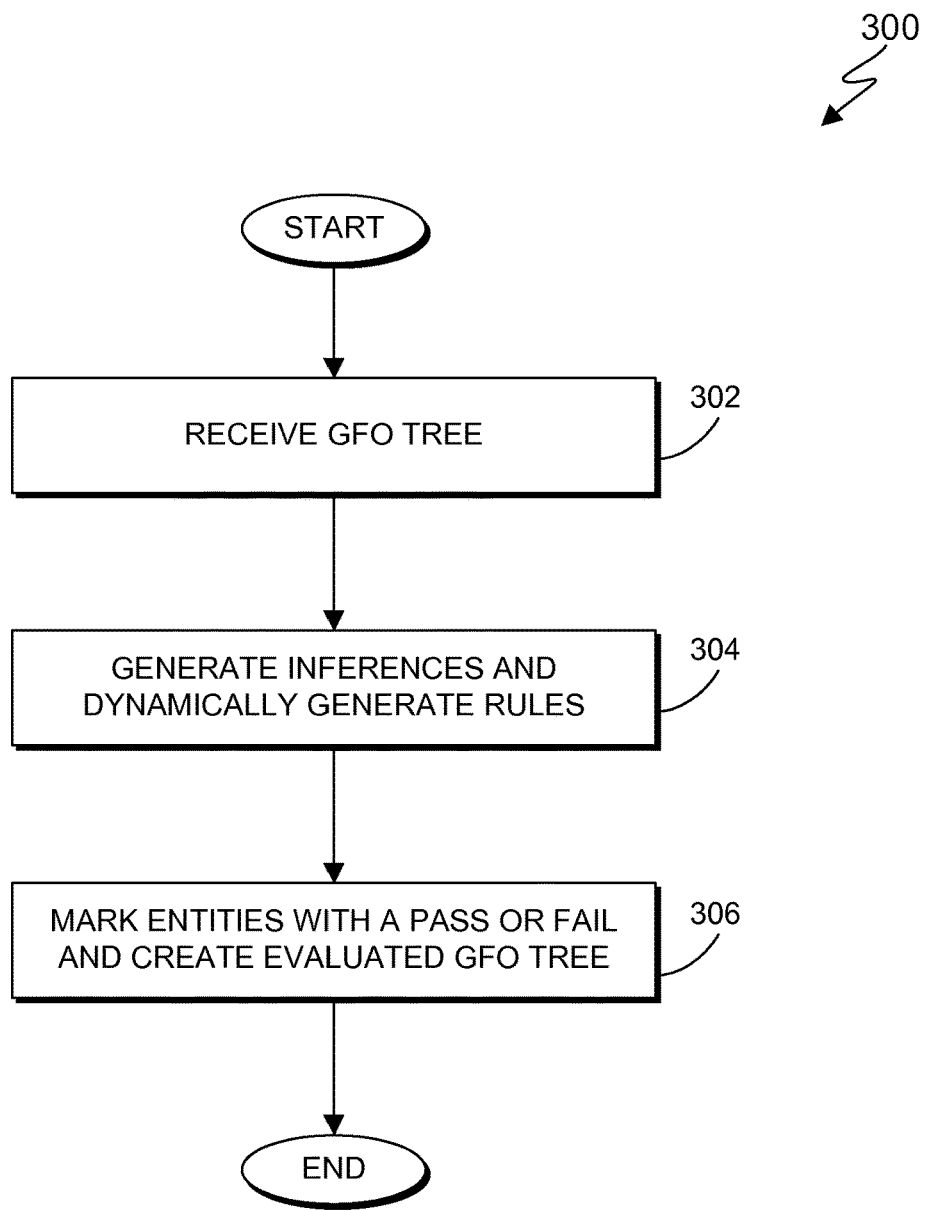
FIG. 3 is a flowchart depicting operational steps of the semantic reasoner engine evaluation process, in accordance with an embodiment of the present invention.

FIG. 3 is a flowchart, 300, depicting operational steps of semantic reasoner engine 140 performing the evaluation process, in accordance with an embodiment of the present invention.

In step 302, semantic reasoner engine 140 receives a GFO tree from ontology relationship mapper 130.

In step 304, semantic reasoner engine 140 generates inferences and dynamically generates rules to validate each ontology down to the level of the individual entity values. The generated inferences rely on the relationships derived from other ontologies, while the generated rules are specified constraints within the instant ontology. For example, an area code for a telephone number has a locality, which can be inferred from the geospatial, or address, ontology (i.e., an area code specific to a USA city). This is an inference because it relies on the relationship derived from the address ontology. On the other hand, the format of a telephone number is constrained for a certain locality. For example, a specified constraint requires that USA telephone numbers must contain ten digits with the first three digits representing a valid area code (i.e., an area code specific to a USA city). This constraint is a rule because it is a constraint specified within the instant phone number ontology. Rules are generated dynamically (i.e., they are generated independently of and are not reused for other ontologies) because they are specific to an ontology. As previously discussed, there are multiple strategies to generate rules and inferences, however, it should be appreciated that any suitable method(s) of generating rules and inferences may be used. The generated rules and inferences have an entity mapping which is later used by result parser 150 to evaluate the evaluated GFO tree.

In step 306, semantic reasoner engine 140 marks the entities with a pass tag or a fail tag. In this exemplary embodiment, each entity is tagged (as a property) with a valid or invalid indicator. The parameters that indicate whether an entity has passed or failed (i.e., valid or invalid) are determined by the generated rules and inferences. The rule(s) which caused an invalid indicator is added as a property on the entity such that it can be viewed later by a user. The evaluated set of entities form an evaluated GFO tree.

Figure 4:
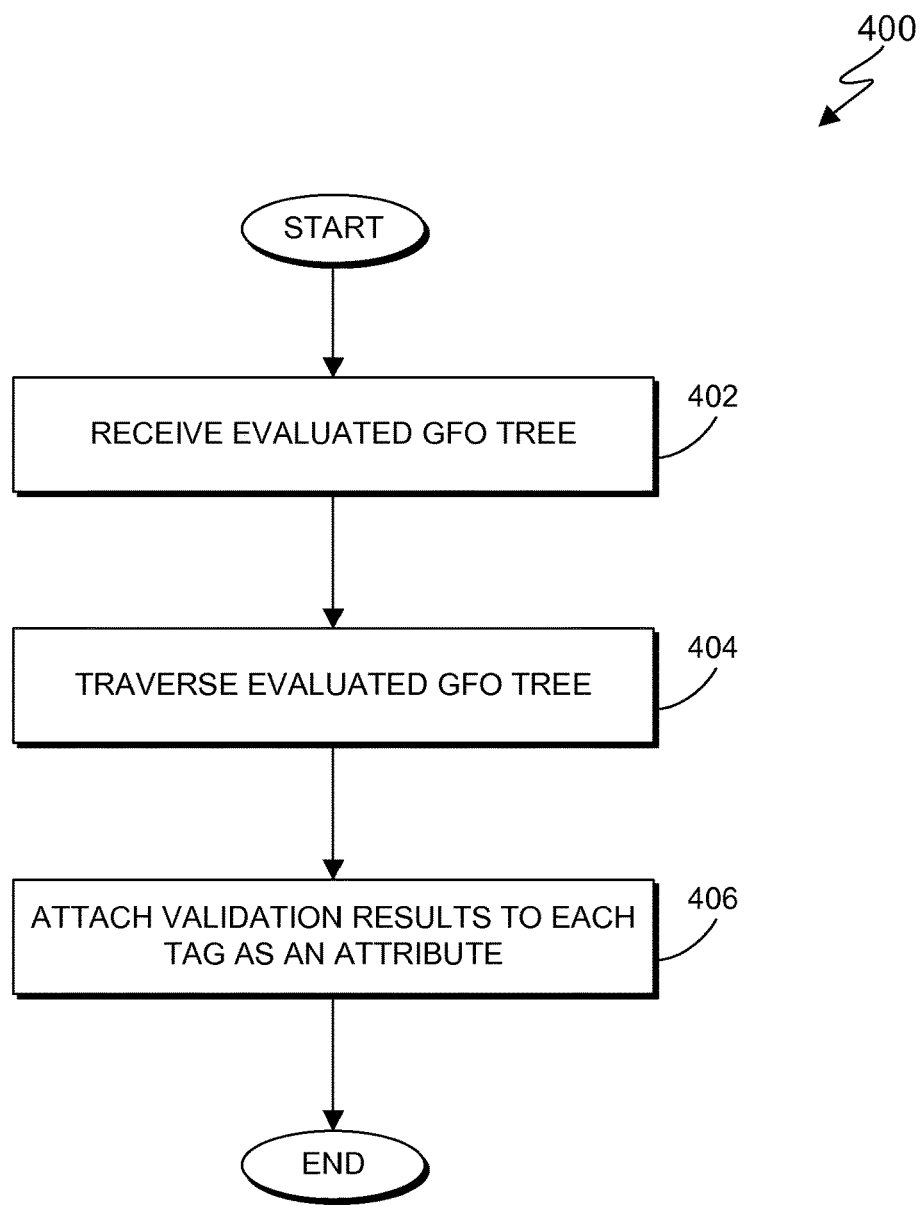
FIG. 4 is a flowchart depicting operational steps of the result parser validation process, in accordance with an embodiment of the present invention.

FIG. 4 is a flowchart, 400, depicting operational steps of result parser 150 performing the validation process, in accordance with an embodiment of the present invention.

In step 402, result parser 150 receives the evaluated GFO tree from semantic reasoner engine 140.

In step 404, result parser 150 traverses the evaluated GFO tree and individually enhances the tags on the original HTML/XML form with the validation results (i.e., a pass tag, or fail tag and possibly the reason). In this exemplary embodiment, result parser 150 matches the entities back to the original electronic form and copies the indicators, or tags, along with the rule to a copy of the electronic form. Result parser 150 may also list one or more reasons the entity received a fail tag. For example, if an entity has a fail tag, result parser 150 may list failure to comply with a generated rule as a reason for that fail tag (i.e., <PostalCode><ValidationError>Postal Code in Singapore must be in 6 digits). In this example, the validation results are viewed in an XML based document language, however, it should be appreciated that any other suitable method of indicating validation results may be used.

In step 406, result parser 150 creates a form that includes the original form with the validation results attached to each tag as an attribute that can be displayed to the user. In this exemplary embodiment, the user can then see which input fields failed the validation and correct the entry as needed.

Figure 5:
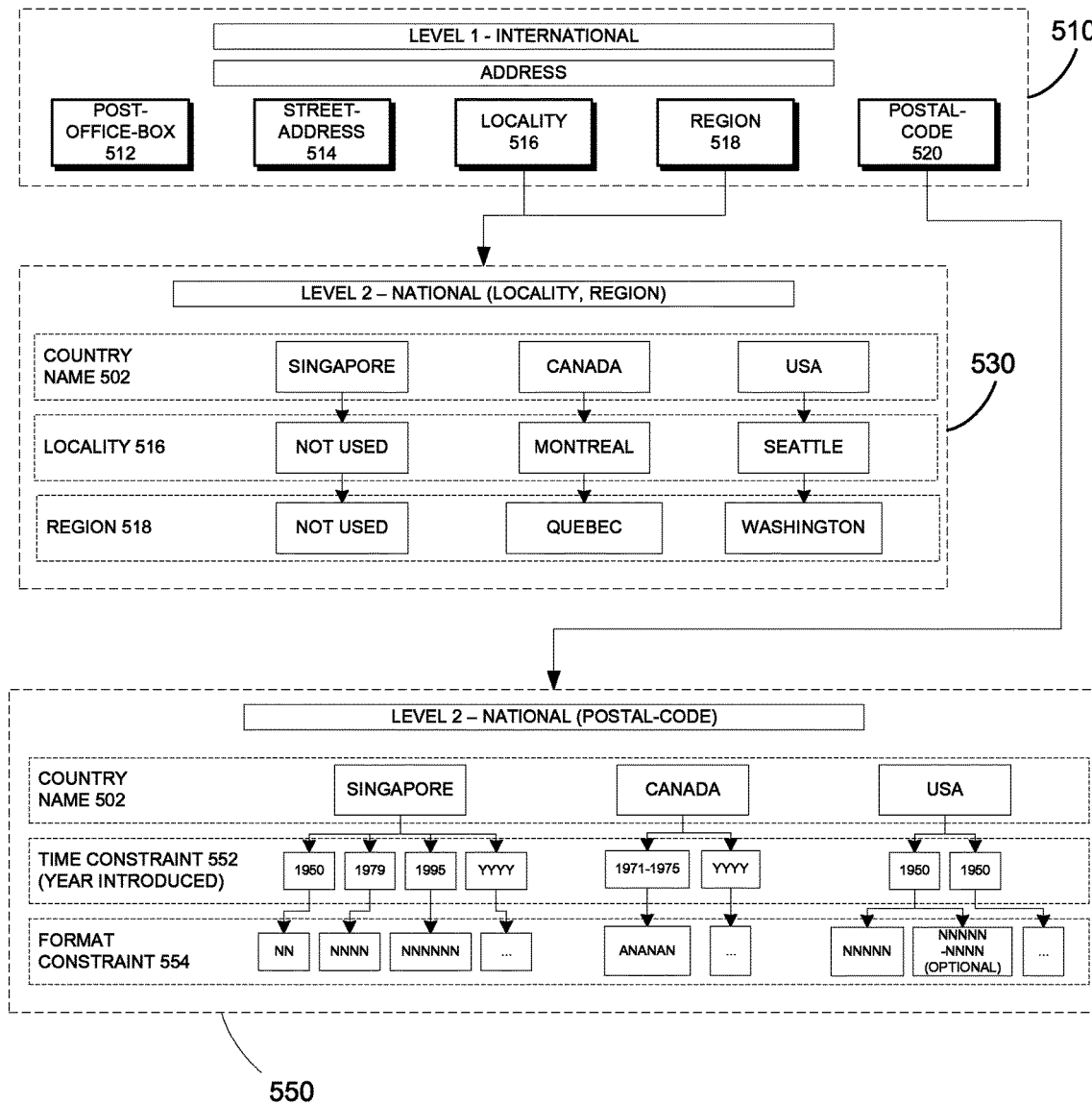
FIG. 5 is an example illustrating a mechanism for propagating properties and rules of an entity in a semantic network, in accordance with an embodiment of the present invention.

FIG. 5 is an example illustrating a mechanism for propagating properties and rules of an entity in a semantic network, as well as for detecting and handling semantic constraint violation, in accordance with an embodiment of the present invention.

Level 1 block (International) 510 shows an Address entity as a composite attribute, consisting of five constituents: post-office-box 512, street-address 514, locality 516, region 518, and postal-code 520. The properties and constraints on these constituents are passed downstream to Level 2 block (National) 530 and Level 2 block (National) 550.

In one embodiment, semantic reasoner engine 140 uses a predetermined cardinality ratio constraint to specify the number of relationship instances an entity can participate in. The cardinality ratio constraint requires that it has at most, one of these constituents. The Address entity, for example, contains a 1:1 cardinality ratio constraint for the constituents locality 516 and region 518. Thus, an Address entity may have a constituent that has a null value. For example, referring to level 2-national 530, the constituents locality 516 and region 518 have a null value for country-name "Singapore" as it is not applicable in its domain context. On the other hand, locality 516 and region 518 may contain string value (e.g., Montreal and Quebec, respectively) for the country-name Canada, and string value (e.g., Seattle and Washington, respectively) for the country-name USA. The Address entity may also contain a 1:N or M:N cardinality ratio constraint for the constituent postal code 520, where M and N can mean "1 or more." For example, referring to level 2-national 550, the constituent postal code 520 may contain string value for the country name Singapore, Canada, and USA (i.e., year introduced and formal constraint).

The validation rules that enforce the constituent postal-code 520 (see level 2-national 550) are generated depending on domain constraints (which specifies the set of values an attribute can take, {"Singapore," "Canada," "USA"} in this example), time constraints 552 (the year in which format changes are introduced in the country-name), format constraints 554 (which comprises of numerical digits, alphabetical string, and ordering sequence, etc.), and single-value constraints (which requires that the postal-code be unique in its domain context). Thus, the postal-code in country-name "Singapore" and time "Introduced 1995" will be a unique six decimal numerical digit value 'NNNNNN', where N is any digit 0 through 9. In addition, the framework allows new semantic constraints to be added from domain specific requirements. For instance, if a new postal-code format is required for a country-name in a future year "YYYY", where Y is any digit 0 through 9, a new set of time constraints can be applied to the domain.

The framework also enables detection of semantic constraints (i.e., constraints on the entities in the GFO tree) violations in a specific domain. In one embodiment, the semantic constraints can be expressed as an integer programming (IP) formulation. IP formulation is a mathematical optimization program in which some or all of the variables are restricted to be integers, and is one method to detect violations of constraints in the GFO tree. It should be appreciated, however, that any other suitable method for detecting constraint violations may be used. For example, if the semantic constraints are transitive, the coexistence, dependency, and sequence relationships between entities on the GFO tree can be represented because of the transitive property (i.e., the semantic constraints are interrelated). The IP formulation can then be solved to identify the violations. The entity will be tagged with an invalid indicator and the rules that produce the violations will be added as properties on the entity.

Figure 6:
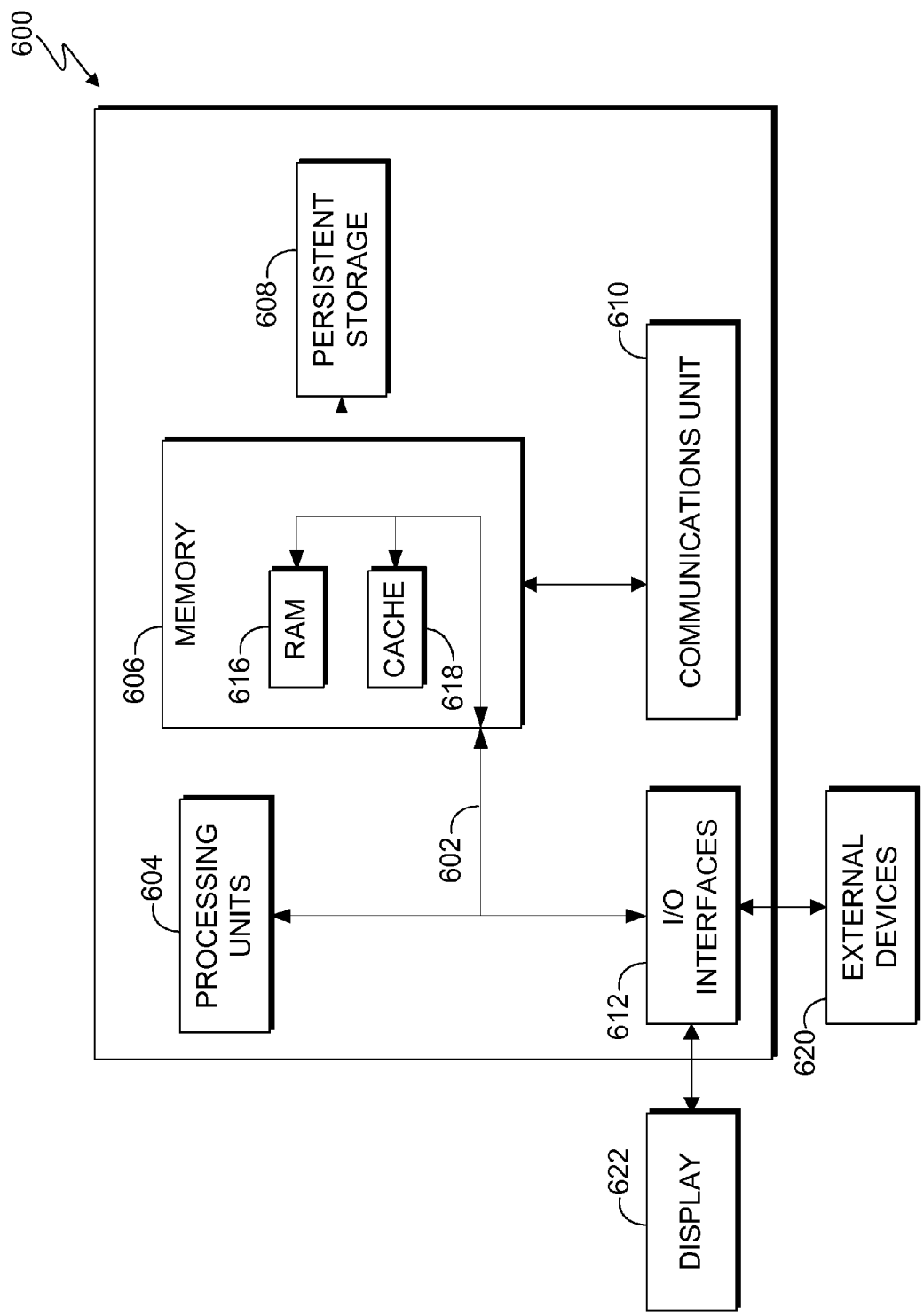
FIG. 6 is a block diagram of internal and external components of the computing environment of FIG. 1, in accordance with an embodiment of the present invention.

FIG. 6 is a block diagram of internal and external components of computing device 600, which is representative of computing environment 100 of FIG. 1, in accordance with an embodiment of the present invention. It should be appreciated that FIG. 6 provides only an illustration of one implementation and does not imply any limitations with regard to the environments in which different embodiments may be implemented. In general, the components illustrated in FIG. 6 are representative of any electronic device capable of executing machine-readable program instructions. Examples of computer systems, environments, and/or configurations that may be represented by the components illustrated in FIG. 6 include, but are not limited to, personal computer systems, server computer systems, thin clients, thick clients, laptop computer systems, tablet computer systems, cellular telephones (i.e., smart phones), multiprocessor systems, microprocessor-based systems, network PCs, minicomputer systems, mainframe computer systems, and distributed cloud computing environments that include any of the above systems or devices.

Computing device 600 includes communications fabric 602, which provides for communications between one or more processing units 604, memory 606, persistent storage 608, communications unit 610, and one or more input/output (I/O) interfaces 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 616 and cache memory 618. In general, memory 606 can include any suitable volatile or non-volatile computer readable storage media. Software is stored in persistent storage 608 for execution and/or access by one or more of the respective processing units 604 via one or more memories of memory 606.

Persistent storage 608 may include, for example, a plurality of magnetic hard disk drives. Alternatively, or in addition to magnetic hard disk drives, persistent storage 608 can include one or more solid state hard drives, semiconductor storage devices, read-only memories (ROM), erasable programmable read-only memories (EPROM), flash memories, or any other computer readable storage media that is capable of storing program instructions or digital information.

The media used by persistent storage 608 can also be removable. For example, a removable hard drive can be used for persistent storage 608. Other examples include optical and magnetic disks, thumb drives, and smart cards that are inserted into a drive for transfer onto another computer readable storage medium that is also part of persistent storage 608.

Communications unit 610 provides for communications with other computer systems or devices via a network. In this exemplary embodiment, communications unit 610 includes network adapters or interfaces such as a TCP/IP adapter cards, wireless Wi-Fi interface cards, or 3G or 4G wireless interface cards or other wired or wireless communications links. The network can comprise, for example, copper wires, optical fibers, wireless transmission, routers, firewalls, switches, gateway computers and/or edge servers. Software and data used to practice embodiments of the present invention can be downloaded to computing device 600 through communications unit 610 (i.e., via the Internet, a local area network, or other wide area network). From communications unit 610, the software and data can be loaded onto persistent storage 608.

One or more I/O interfaces 612 allow for input and output of data with other devices that may be connected to computing device 600. For example, I/O interface 612 can provide a connection to one or more external devices 620 such as a keyboard, computer mouse, touch screen, virtual keyboard, touch pad, pointing device, or other human interface devices. External devices 620 can also include portable computer-readable storage media such as, for example, thumb drives, portable optical or magnetic disks, and memory cards. I/O interface 612 also connects to display 622.

Display 622 provides a mechanism to display data to a user and can be, for example, a computer monitor. Display 622 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for semantic database driven form validation, comprising:
   processing, by one or more computer processors, a first form to reduce said first form into one or more individual elements;
   generating, by one or more computer processors, a group of descriptors for each of said one or more individual elements, wherein said group of descriptors comprises, at least, a set of entities for each of said one or more individual elements;
   matching, by one or more computer processors, each of said set of entities to a first ontology to create one or more general formal ontology (GFO) trees, wherein each of said set of entities comprises a form field, by:
      searching, by one or more processors, one or more semantic databases for one or more related ontologies, wherein said one or more related ontologies are either directly or indirectly related to an entity,
      calculating, by one or more processors, a predictive value for each of said one or more related ontologies, wherein said predictive value indicates how accurately each of said one or more related ontologies matches the entity,
      determining, by one or more processors, that a first ontology produces a predictive value that yields a most accurate match for said entity, and
      assigning, by one or more processors, said first ontology to said entity to create one or more general formal ontology (GFO) trees;

generating, by one or more computer processors, a set of rules;

generating, by one or more computer processors, based, at least in part, on said generated set of rules, a set of validation results for each of said set of entities;

creating, by one or more computer processors, a resulting form, wherein said resulting form includes said first form with said set of validation results attached to each of said entities as an attribute;

detecting, by one or more computer processors, violations of one or more constraints in one or more GFO trees based on integer variables, wherein said violations are attached to each of said entities as the attribute; and outputting, by one or more computer processors, the attribute in a display to an end-user, wherein the display contains input fields, wherein the attribute is used to correct said input fields.

2. The method of claim 1, wherein said group of descriptors is transferred to an ontology relationship mapper, wherein said ontology relationship mapper performs said matching.

3. The method of claim 1, wherein said first form is a semi-structure tagged form in a format including tagged based languages of HTML or XML.

4. The method of claim 1, wherein generating a set of rules comprises:
determining, by one or more computer processors, said one or more constraints, wherein said constraints are derived from said first ontology; and
determining, by one or more computer processors, one or more inferences based on a set of data, wherein said set of data includes, in part, entity relationship data derived from a second ontology.

5. The method of claim 1, wherein generating a set of validation results for each of said set of entities comprises:
traversing, by one or more computer processors, said one or more GFO trees with said set of rules; and
designating, by one or more computer processors, each of said set of entities with a pass tag or a fail tag to form an evaluated GFO tree, wherein a pass tag designates that an entity complies with said set of rules and a fail tag designates that an entity does not comply with said set of rules.

6. The method of claim 5, further comprising:
in response to determining that an entity does not comply with said set of rules, designating, by one or more computer processors, said entity with a fail tag; and
indicating, by one or more computer processors, a reason that said entity received said fail tag.

7. The method of claim 1, wherein said group of descriptors further comprises a set of classes, and a set of properties for each of said one or more individual elements.

8. A computer program product comprising:
a computer readable storage medium and program instructions stored on the computer readable storage medium, the program instructions comprising:
program instructions to process a first form to reduce said first form into one or more individual elements;
program instructions to generate a group of descriptors for each of said one or more individual elements, wherein said group of descriptors comprises, at least, a set of entities for each of said one or more individual elements;
program instructions to match each of said set of entities to a first ontology to create one or more general formal ontology (GFO) trees, wherein each of said set of entities comprises a form field, by:

program instructions to search one or more semantic databases for one or more related ontologies, wherein said one or more related ontologies are either directly or indirectly related to an entity, program instructions to calculate a predictive value for each of said one or more related ontologies, wherein said predictive value indicates how accurately each of said one or more related ontologies matches the entity, program instructions to determine that a first ontology produces a predictive value that yields a most accurate match for said entity, and program instructions to assign said first ontology to said entity to create one or more general formal ontology (GFO) trees;

program instructions to generate a set of rules;

program instructions to generate based, at least in part, on said generated set of rules, a set of validation results for each of said set of entities;

program instructions to create a resulting form, wherein said resulting form includes said first form with said set of validation results attached to each of said entities as an attribute;

program instructions to detect violations of one or more constraints in said one or more GFO trees based on integer variables, wherein said violations are attached to each of said entities as the attribute; and program instructions to output the attribute in a display to an end-user, wherein the display contains input fields, wherein the attribute is used to correct said input fields.

9. The computer program product of claim 8, wherein said group of descriptors is transferred to an ontology mapper, wherein said ontology relationship mapper performs said matching.

10. The computer program product of claim 8, wherein said first form is a semi-structure tagged form in a format including tagged based languages of HTML or XML.

11. The computer program product of claim 8, wherein the program instructions to generate a set of rules comprise:
program instructions to determine said one or more constraints, wherein said constraints are derived from said first ontology; and
program instructions to determine one or more inferences based on a set of data, wherein said set of data includes, in part, entity relationship data derived from a second ontology.

12. The computer program product of claim 8, wherein the program instructions to generate a set of validation results for each of said set of entities comprise:
program instructions to traverse said one or more GFO trees with said set of rules; and
program instructions to designate each of said set of entities with a pass tag or a fail tag to form an evaluated GFO tree, wherein a pass tag designates that an entity complies with said set of rules and a fail tag designates that an entity does not comply with said set of rules.

13. The computer program product of claim 12, further comprising:
program instructions to, in response to determining that an entity does not comply with said set of rules, designate said entity with a fail tag; and
program instructions to indicate a reason that said entity received said fail tag.

14. The computer program product of claim 8, wherein said group of descriptors further comprises a set of classes and a set of properties for each of said one or more individual elements.

15. A computer system comprising:
one or more computer processors;
one or more computer readable storage media;
program instructions stored on the computer readable storage media for execution by at least one of the one or more computer processors, the program instructions comprising:
  program instructions to process a first form to reduce said first form into one or more individual elements;
  program instructions to generate a group of descriptors for each of said one or more individual elements, wherein said group of descriptors comprises, at least, a set of entities for each of said one or more individual elements;
  program instructions to match each of said set of entities to a first ontology to create one or more general formal ontology (GFO) trees, wherein each of said set of entities comprises a form field, by:
    program instructions to search one or more semantic databases for one or more related ontologies, wherein said related ontologies are either directly or indirectly related to an entity,
    program instructions to calculate a predictive value for each of said one or more related ontologies, wherein said predictive value indicates how accurately each of said one or more related ontologies matches said entity,
    program instructions to determine that a first ontology produces a predictive value that yields a most accurate match for said entity, and
    program instructions to assign said first ontology to said entity to create one or more general formal ontology (GFO) trees;
  program instructions to generate a set of rules;
  program instructions to generate based, at least in part, on said generated set of rules, a set of validation results for each of said set of entities;
  program instructions to create a resulting form, wherein said resulting form includes said first form with said set of validation results attached to each of said entities as an attribute;
  program instructions to detect violations of one or more constraints in said one or more GFO trees based on integer variables, wherein said violations are attached to each entity of said entities as the attribute; and
  program instructions to output the attribute in a display to an end-user, wherein the display contains input fields, wherein the attribute is used to correct said input fields.

16. The computer system of claim 15, wherein the program instructions to generate a set of rules comprise:
  program instructions to determine said one or more constraints, wherein said constraints are derived from said first ontology; and
  program instructions to determine one or more inferences based on a set of data, wherein said set of data includes, in part, entity relationship data derived from a second ontology.

17. The computer system of claim 15, wherein the program instructions to generate a set of validation results for each of said set of entities comprise:
  program instructions to traverse said one or more GFO trees with said set of rules;
  program instructions to designate each of said set of entities with a pass tag or a fail tag to form an evaluated GFO tree, wherein a pass tag designates that an entity complies with said set of rules and a fail tag designates that an entity does not comply with said set of rules; and
  program instructions to, in response to determining that an entity does not comply with said set of rules, indicate a reason that said entity received said fail tag.

* * * * *